United States Patent [19]

Hewitt et al.

[11] 4,410,924

[45] Oct. 18, 1983

[54] MOTOR PROTECTION CONTROL CIRCUIT

[75] Inventors: D. Gary Hewitt, Mt. Vernon; Thomas A. Jones, Lucas, both of Ohio

[73] Assignee: The Gorman-Rupp Company, Mansfield, Ohio

[21] Appl. No.: 301,106

[22] Filed: Sep. 10, 1981

[51] Int. Cl.³ .............................................. H02H 7/08
[52] U.S. Cl. ....................................... 361/25; 361/26; 318/782; 318/783; 307/126; 417/1; 417/45
[58] Field of Search ...................... 361/24, 26, 27, 23, 361/25, 28, 29, 31, 32, 22, 163, 166, 210; 318/471, 472, 782, 783, 784; 307/126, 139; 417/237, 410, 1, 45

[56] References Cited

U.S. PATENT DOCUMENTS

| | | |
|---|---|---|
| 3,136,922 | 6/1964 | Hynd . |
| 3,603,806 | 9/1971 | Hitzke .............................. 361/22 X |
| 3,636,426 | 1/1972 | Buiting . |
| 3,686,511 | 8/1972 | Pauly ................................ 361/56 X |
| 3,887,849 | 6/1975 | Nagel ............................... 361/56 X |
| 3,995,199 | 11/1976 | Pfarrer ................................. 361/22 |

Primary Examiner—Patrick R. Salce

Attorney, Agent, or Firm—Watts, Hoffmann, Fisher & Heinke

[57] ABSTRACT

A protection device and circuit for a fluid pump or the like including a motor control relay MS for actuating relay contacts MS-1, MS-2, MS-3 that control the communication of power to a drive motor 10a, and a manual reset motor protection device 24 that deenergizes the control relay in response to sensed malfunctions. The motor protection device comprises a manual reset motor protector 40 having switch contacts 42 connected in series with the motor control relay and a tripping coil 44 which, when energized, opens the switch contacts. A current shunt path 46 including serially connected pump assembly mounted sensors 48, 50, normally shunts current around the tripping coil and is interrupted in the event of a sensed malfunction, causing the energization of the tripping coil which opens the switch contacts and deenergizes the drive motor. The switch contacts must be manually reclosed to reactivate the pump assembly. The impedance of the tripping coil and the motor control relay are selected so that should the switch contacts fail to open in response to energization of the tripping coil, the impedance of the tripping coil will reduce the voltage on the control relay below its seal-in value, thereby deenergizing the control relay.

3 Claims, 4 Drawing Figures

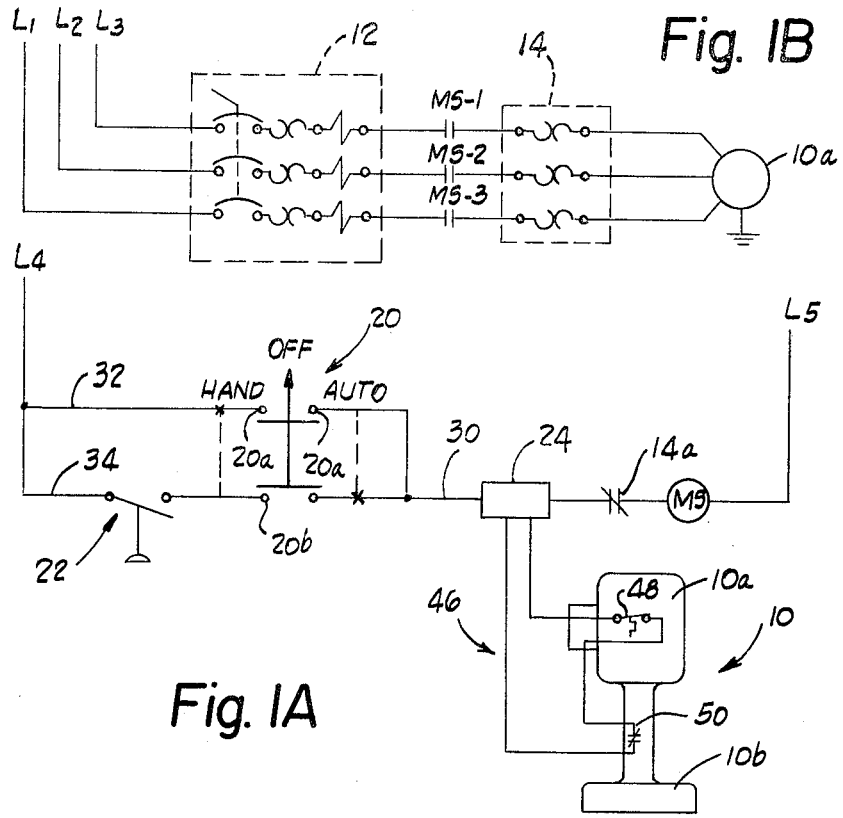
Fig. 1B
Fig. 1A
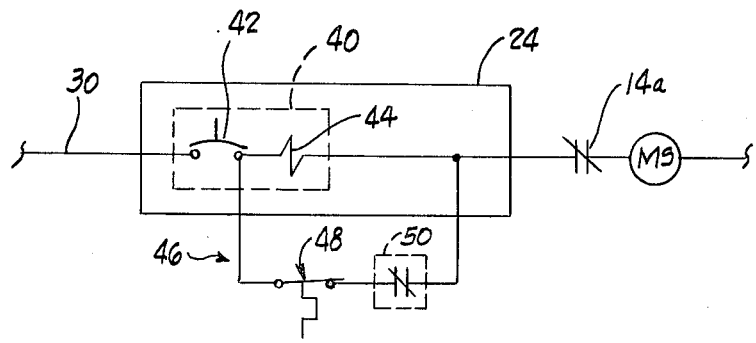
Fig. 2

MOTOR PROTECTION CONTROL CIRCUIT

DESCRIPTION

TECHNICAL FIELD

The present invention relates generally to motor protection devices and in particular to a motor protector and control circuit for a fluid pump or the like.

BACKGROUND ART

In waste water treatment processes, relatively large, high capacity fluid pumps are employed to pump sewage, waste water, etc. through the treatment process. In general, the pumps are located in sumps or reservoirs and are selectively energized as a function of the fluid flow rate into the sump. In most instances, a level sensor monitors the liquid level in the sump. The level sensor forms part of a pump control system which energizes the requisite number of pumps needed in order to maintain a predetermined level in the sump.

Most pumps used in the above described environment, include detection devices or circuitry for deenergizing the pump drive motor in the event of a malfunction such as a pump overload. The two most prevalent forms of protection currently used in the industry are: (1) thermal switches located in the drive motor housing which open if the motor exceeds a predetermined temperature and (2) current monitoring sensors which interrupt power to the drive motor should the drive motor current levels exceed a predetermined threshold.

In the first protection method, thermal responsive contacts respond quickly to an overload condition but because they are located in the pump motor housing which is often submerged in the sump, they cannot be manually reset and therefore in most instances, the contacts reclose after the pump motor has cooled below the overload temperature and the pump motor is automatically reenergized.

With the second protection method, the current sensor can be made part of a manual reset circuit to prevent restarting the pump motor until the circuit has been manually reset by the operator, thereby apprising the operator of the malfunction and allowing him a chance to investigate. However, the circuit has the inherent disadvantage of only "indirectly" sensing a motor overload. The current sensor is typically mounted at a remote location, the ambient temperature of which can differ substantially from the temperature of the pump environment. If the ambient temperature in the vicinity of the current sensor is substantially higher than the pump environment, "false trips" can occur. Conversely, if the ambient temperature is substantially lower than the pump environment, the current sensor may not open immediately, resulting in possible drive motor damage due to the delayed shutdown.

From the above discussion it should be apparent that a manual reset protection device that includes sensors located in or near the pump motor assembly which directly monitor pump temperature or other conditions, is desirable. The prior proposed devices for providing these desired features have either been ineffective or too costly.

Moisture sensors for monitoring pump seal integrity that are operative to deenergize the pump motor should a seal failure be imminent are also desirable. Like the thermal overload protection, it is desirable that once the pump motor is deenergized by the seal sensor, that it be reenergized only after the circuit has been manually reset, so that the operator is apprised of the malfunction and given an opportunity to take corrective action if warranted to prevent further damage to the pump motor assembly.

DISCLOSURE OF THE INVENTION

The present invention provides a new and improved motor control circuit for use with a fluid pump or the like, which includes sensors directly monitoring the operation of the pump assembly and which must be manually reset if a malfunction condition is sensed.

In the preferred embodiment, the control circuit comprises a control relay such as a motor starter or motor contactor and a manual reset motor protection device that deenergizes the motor starter in response to a sensed malfunction. The starter is conventional and includes power contacts forming part of the drive motor power circuit, that control the communication of the power source to the motor, and a starter coil, forming part of the control circuit for controlling the actuation of the starter contacts. The motor protector includes switch contacts connected in series with the starter coil so that opening of the switch contacts of the protection device deenergizes the motor starter, and a tripping coil which, when energized, opens the switch contacts.

According to the invention, the tripping coil is serially connected intermediate the switch contacts and the starter coil. A sensing circuit including malfunction sensors mounted in or near the pump motor assembly defines a shunt path around the tripping coil so that in the absence of a sensed malfunction, current is shunted around the tripping coil preventing its energization. According to the invention, if a malfunction is sensed by a sensor, the shunt path is interrupted, causing the energization of the tripping coil which in turn opens the protection switch contacts and deenergizes the motor starter, thus deactivating the drive motor. In order to reactivate the drive motor, the switch contacts must be manually reclosed. With the present invention, reclosure of the pump motor assembly mounted sensors will not reactivate the pump.

The disclosed motor protector provides a manual reset feature which requires an operator to manually reclose the circuit after a malfunction has been sensed by the sensor in order to reactivate the drive motor. Moreover, the circuit employs sensors mounted in or near the pump motor assembly so that the condition of the pump motor is directly monitored. In this way, overloads, etc. are sensed immediately by a circuit that is both easy to manufacture and relatively inexpensive. The protection afforded by the circuit is therefore extremely cost effective.

According to the invention, the malfunction sensors comprise thermal switches for monitoring drive motor temperature and/or moisture sensors for detecting seal failure in the pump. The sensing circuit may include one or more of the sensors, preferably connected in a series configuration so that the opening of any one switch interrupts the current path through the sensor shunt circuit. In the preferred embodiment, the sensors include normally closed switches which complete the current path. When a malfunction is sensed by a given sensor, the sensor responds to the malfunction by opening its switch contacts, interrupting the shunt path around the tripping coil thereby effecting its energization.

According to a feature of the invention, the impedance of the tripping coil and motor starter coil are chosen so that the energization of the tripping coil drops the voltage across the starter coil below its "seal-in" voltage thereby deenergizing the motor starter even if the protector switch contacts fail to open in response to actuation of the tripping coil. This fail safe feature insures the deactivation of the drive motor in response to a sensed malfunction even if the protector switch fails to open.

Additional features and a fuller understanding of the present invention will be obtained in reading the following detailed description made in connection with the accompanying drawings.

BRIEF DESCRIPTION OF THE DRAWINGS

FIGS. 1A and 1B illustrate pump power and control circuits embodying the present invention;

FIG. 2 illustrates a portion of the circuit shown in FIG. 1A; and,

BEST MODE FOR CARRYING OUT THE INVENTION

Figure 3:
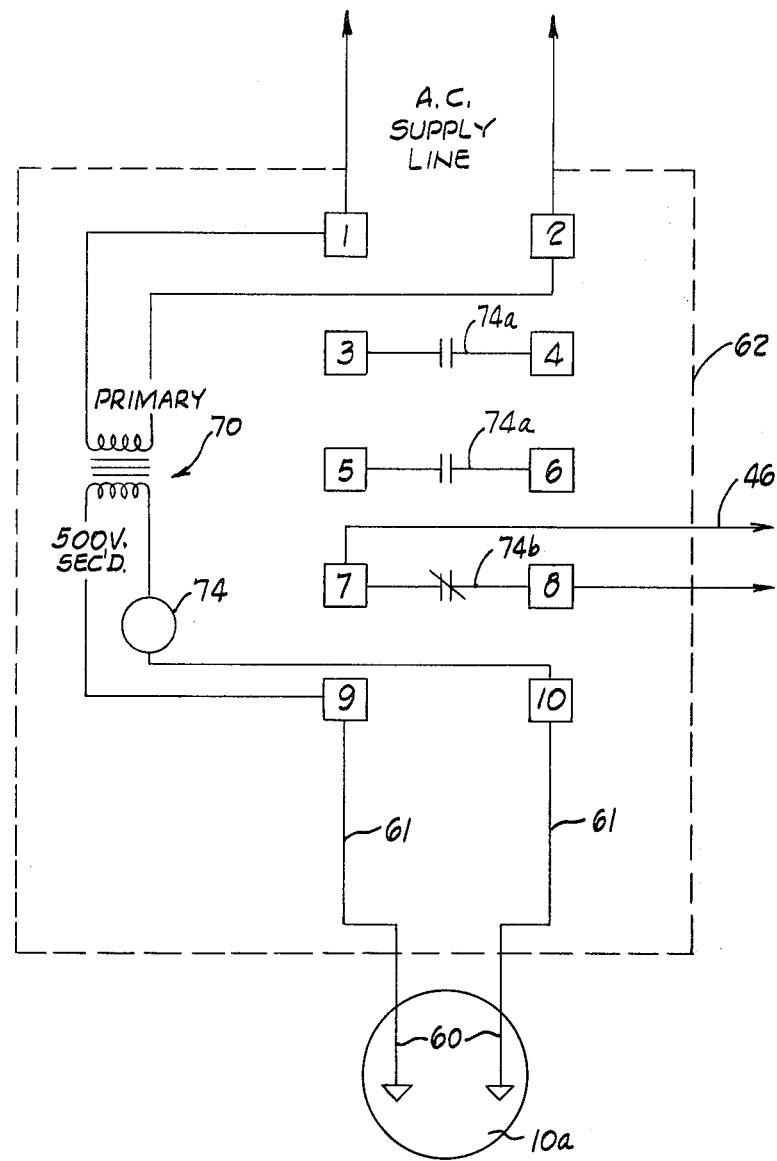
FIG. 3 illustrates an example of a moisture sensor and circuit that is operable in connection with the motor protector circuit of the present invention.

FIGS. 1A and 1B illustrate control and power circuits, respectively, for a submersible pump assembly 10 that includes a drive motor 10a operatively connected to a fluid pump 10b (indicated schematically). For purposes of explanation, the invention will be described for use in connection with a submerged waste water or sewage pump. It should be understood however, that the principles of the invention are applicable to electrically driven fluid pumps in general and the invention can be adapted to various other environments and applications.

In a typical waste water or sewage application, one or more pumps are usually submerged in a sump or well and are energized whenever the sump level exceeds a predetermined level. In applications where a plurality of pumps are used, the number of pumps energized will depend on the inflow into the sump and only the number of pumps necessary to maintain a given level will be energized. Typically, the control circuit for the fluid pumps will include an alternator circuit for changing the sequence of pump activation in response to sensing an excessive level in the sump. By alternating which pump is energized first, the overall pump operating time and hence pump wear is equalized among the pumps.

Although FIGS. 1A and 1B illustrate a single pump and associated circuitry, the invention disclosed is equally applicable to multi-pump installations. Those skilled in the art will recognize that additional pumps and an associated alternator circuit for changing the sequence of energization of the pumps can be easily added.

In the illustrated embodiment, the drive motor 10a (see FIG. 1B) is powered by a conventional three-phase circuit. It should be recognized that the invention is equally applicable to a pump motor powered by a single phase circuit. Power lines $L_1$, $L_2$, and $L_3$ are suitably connected with the source (not shown). Each line includes overload protection devices 12, 14. The overload protection device 12 is preferably a manual reset circuit breaker which opens automatically in the event current in any of the lines $L_1$, $L_2$, or $L_3$ exceeds a preset level. It should be noted, an overload in any one line causes the opening of the breaker 12 and concurrently interrupts current flow through each line.

The overload device 14 protects the drive motor 10a against currents in excess of the maximum current rating of the motor. The device includes a normally closed contact 14a that forms part of the control circuit shown in FIG. 1A. The contact 14a opens if excess current is sensed in any of the motor power leads $L_1$, $L_2$, or $L_3$.

The control circuit illustrated in FIG. 1A controls the energization of the pump 10. Lines $L_4$ and $L_5$ are connected across a suitable source of AC power, such as 24 volts or 110 volts AC. The control circuit shown in FIG. 1A controls the energization of the pump 10 by means of a motor starter MS. The starter MS concurrently operates contacts MS-1 through MS-3 that form part of the motor power circuit shown in FIG. 1B and control the communication of power along the power leads $L_1$, $L_2$ and $L_3$ to the drive motor 10a. When the motor starter MS is energized, its associated contacts close and communicate electrical power to the drive motor 10a.

As seen in FIG. 1A, the motor control circuit also includes a three-position selector switch 20, a fluid level responsive switch 22 and a motor protection device 24 constructed in accordance with the preferred embodiment of the invention. The selector switch 20 is moveable from an OFF position to either a HAND or AUTO position. The switch 20 is illustrated in its OFF position in which the communication of electrical power from the line $L_4$ to the motor starter MS is interrupted. When the switch 20 is moved to the HAND position, the contacts 20a are closed thereby communicating power from the line $L_4$ to a line 30 via branch line 32. The motor starter MS is immediately energized provided that both the contact 14a and the protection device 24 are closed.

When the selector switch is moved to the AUTO position, the communication of electrical power to the motor starter MS from the line $L_4$ is controlled by the fluid level responsive switch 22 located in a line 34. It will be recognized that various forms of the switch 22 are currently available in the industry. The switch may respond directly to a change in fluid level via a float mechanism or alternately respond to a change in water pressure in the sump at a given sump depth which occurs as a result of a change in the liquid level in the sump. When the switch 20 is in its AUTO position, closure of the switch 22 will actuate the pump motor 10a provided the devices 14a and 24 are both closed.

FIG. 2 schematically illustrates the construction of the motor protection device 24. The protection device 24 includes a manual reset motor protector 40 having a switch contact 42 and a tripping coil 44 which, when energized, opens the switch 42 and interrupts the flow of current to the motor starter MS.

A current shunt loop indicated generally by the reference character 46 includes pump malfunction sensors 48, 50 which in normal operation, shunt current around the tripping coil 44 to prevent the activation of the protector 40. The malfunction sensors 48, 50 are readily available thermal overload switches or seal failure detectors. In the illustrated circuit, the sensor 48 is a thermal switch positioned proximate to or in the motor windings of the drive motor 10a which opens in response to a sensed over-temperature condition in the motor. The sensor 50 is a seal failure sensor which senses the entry of water or other moisture contaminants into the pump or pump drive which occurs as a consequence of seal leakage or impending seal failure.

The opening of either or both monitoring sensors 48, 50 in response to a sensed malfunction interrupts the current loop 46 and immediately energizes the tripping coil 44 which in turn opens the switch contact 42 thereby denergizing the motor starter MS. The contacts MS-1, MS-2, and MS-3 shown in FIG. 1B open to interrupt power to the drive motor 10*a*.

Although multiple malfunction sensors are illustrated and preferred, a single sensor such as a thermal switch is also contemplated by the present invention. It should be noted that the combination of thermal and seal failure sensors affords substantial protection for a fluid pump, possibly preventing catastrophic damage by inhibiting the operation of the pump motor assembly in an overloaded or partially failed condition.

The motor protector 40 provides a manual reset overload feature that operates in conjunction with commonly available thermal overload and moisture sensor switches. Unlike the prior art, the reclosing of the thermal switch 48 located in the drive motor 10*a* or the seal failure sensor 50 located in the pump assembly 10 will not reactive the pump unless and until the switch 42 is manually reclosed.

The inclusion of the motor protection device 24 in a pump control circuit may eliminate the need for the overload device 14, for it has been found that sufficient protection for the pump motor 10*a* is provided by the combination of the devices 12 and 24. Although redundant, the device 14 can be included in the circuit for added pump protection.

The motor protector 40 for use in the protection device 24 is available from Airpax Electronics located in Cambridge, Mass and is designated by Airpax as a "Relay Trip". The novel application of this control provides a reliable and economical method for providing manual reset overload protection for a submersible pump. As discussed earlier, many submersible pump applications include auto reset protection which, in the case of thermal switches, causes the pump to reactivate once it has cooled below its overload temperature. With the present invention, the pump will not restart until the switch contact 42 forming part of the control 40 is manually reclosed.

In the preferred and illustrated embodiment, the motor protector 40 provides a fail safe feature which is operative to deenergize the motor starter MS in response to a sensed malfunction even if the switch 42 fails to open. As seen in FIG. 2, the tripping coil 44 is placed in series with the starter coil MS when the current shunt path 46 is opened. According to this feature, the impedances of the tripping coil 44 and motor starter MS are chosen so that energization of the coil 44 will reduce the voltage on the starter MS below its "seal-in" value, thereby deenergizing the motor starter MS.

As an example, the impedance of the tripping coil 44 used in a 115 volt control circuit is approximately 2600 ohms, resulting in a current draw of 0.04 amps whenever the tripping coil is energized. A selected motor starter requires a minimum of 22 volt-amps to operate which translates to a current draw of 0.19 amps at 115 volts. It will be appreciated that the impedance of the tripping coil 44 will limit the current draw to 0.04 amps along the line 30 thus reducing the amperage available for the motor starter to a value below its minimum "seal-in" value. The energization of the tripping coil 44 will thus deenergize the motor starter MS by either directly opening the switch contacts 42 or alternately, if the contacts fail to open, by virtue of its impedance in the line 30 which reduces the current available for energizing the starter MS to a value below its minimum operating value.

In normal operation, the energization of the tripping coil 44 in response to a sensed malfunction in the current shunt path 46, will effect opening of the relay switch 42, thereby deenergizing the motor starter MS. Thus in normal operation, the pump motor 10*a* will remain deenergized until the switch 42 is manually reclosed by an operator. It will be recognized, however, that when the protection device 24 operates in its "fail safe" mode, that is, the mode in which the impedance of the tripping coil 44 causes the deenergization of the starter MS, the device 24 will operate as an AUTO-RESET protection device. In particular, should the switch arm 42 fail to open in response to energization of the coil 44, the starter MS will deenergize as a result of the added impedance placed in the line 30 by the tripping coil 44. The starter MS will reenergize if the sensed malfunction is eliminated or disappears, i.e., if the drive motor 10*a* cools below its overload temperature so that the thermal contacts 48 reclose. Thus, in the "fail-safe" mode of operation, the protection device 24 operates as a conventional auto reset protector.

The moisture sensor 50 may be one of several commercially available sensors. A relatively simple sensor (not shown) comprises a device that includes contacts which are normally electrically connected. A moisture sensitive element interrupts the electrical connection between the contacts in the event moisture enters the environment. A moisture sensor of this type is available from Hidrostal Corporation and is included as part of their Type 100 immersible pumps. The device is designated as a "humidity relay", Part No. 517. Additional information concerning this device is available from Hidrostal.

FIG. 3 illustrates an alternate moisture sensor that includes moisture probes 60 mounted in the vicinity of a pump seal and a probe circuit board 62 connected to the probes and mounted at a remote location. The illustrated moisture sensing circuit is available from The Reliance Electric Company and is designated as a type 2800 control. Complete operating information and data is available from the manufacturer.

By way of summary, the circuit board 62 includes a transformer 70 having a primary side connected to an AC supply line. The transformer secondary operates at 500 volts and is connected to the moisture probes 60 via probe leads 66 that are connected to terminals numbered 9 and 10 of the board 62. A relay coil 74 is disposed in series with one of the probes 60 and includes normally open contacts 74*a* and a normally closed contact 74*b* connected across terminals 7 and 8 of the board 62. It should be apparent that the relay 74 will remain deenergized in the absence of current flow between the probes 60. In normal pump operation, the substances present in the vicinity of the pump seal i.e., lubricating grease or oil, are substantially non-conductive and thus current flow between the probes is inhibited. In the event of seal failure, however, the ingress of moisture in the vicinity of the seal will support current flow between the probes and thus energize the relay coil 74.

To use the disclosed moisture sensing circuit in connection with the present invention, the normally closed contact 74*b* of the relay 74 is connected in the shunt path 46 in series with the thermal switch 48. In essence, the normally closed contact 74b located on the board 62 forms the moisture contact designated by the reference character 50 in FIGS. 1A and 2. It should be noted, that the moisture sensor circuit shown in FIG. 3 is normally supplied with a test circuit to verify the operation of the probes but has been omitted from the drawing for clarity. Further information concerning the operation of the moisture sensing circuit is available from the Reliance Electric Company.

It should be apparent that the present invention discloses a new and improved protection control circuit for the drive motor of a fluid pump. Unlike the prior art, the protection device 24 (under normal operations) will interrupt power to the fluid pump drive motor 10a in the event of a malfunction such as a thermal overload or seal failure, and will reactivate the pump only after the circuit has been manually reset by the operator. With the disclosed circuit, the pump will not reactivate should the malfunction condition disappear.

Moreover, the protection device 24 will terminate pump operation even if the manual resettable switch 42 fails to open, thus providing a fail safe feature for the protection circuit.

Although the invention has been described with a certain degree of particularity, it should be understood that various changes can be made to it by those skilled in the art without departing from the spirit or scope of the invention as hereinafter claimed.

I claim:

1. For a fluid pump used in waste water treatment processes or the like, having a pump casing and an electric drive motor within the casing, a motor control circuit comprising:
   (a) a motor control relay including relay contacts for controlling the communication of a source of electrical power to the pump drive motor, and a relay coil for effecting movement in said relay contacts between closed and open positions;
   (b) a motor protection device including manually closed switch means, located and accessible remotely from said fluid pump, said switch means disposed in series with said relay coil such that opening of said switch means deenergizes said relay coil;
   (c) said protection device further including a tripping coil operative to open said switch means when energized, said tripping coil disposed in electric series communication with said switch means and said relay coil;
   (d) malfunction sensing means located within said pump casing, said sensing means connected in an electrically parallel relationship with said tripping coil such that under normal operating conditions, electrical current is shunted around said tripping coil by said sensing means and said sensing means being operative, in response to a sensed malfunction condition in said drive motor, to interrupt said shunt path thereby energizing said tripping coil to effect opening of said switch means; and
   (e) said tripping coil having an electric impedance sufficient enough to reduce current flow to said relay coil to cause said relay coil to deenergize in the event said manually closed switch means fails to open when said tripping coil is energized.

2. The circuit of claim 1 wherein said malfunction sensing means includes at least one thermal switch located in said pump motor housing, said thermal switch operative to sense an overheat condition in said pump motor.

3. The circuit of claim 1 wherein said malfunction sensing means includes at least one moisture sensor located in said pump housing and operative to detect seal leakage in said pump.

* * * * *